(12) United States Patent
Hirooka et al.

(10) Patent No.: US 11,199,145 B2
(45) Date of Patent: Dec. 14, 2021

(54) CONTROL DEVICE FOR INTERNAL COMBUSTION ENGINE

(71) Applicant: TOYOTA JIDOSHA KABUSHIKI KAISHA, Toyota (JP)

(72) Inventors: Shigemasa Hirooka, Susono (JP); Shingo Korenaga, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/101,111

(22) Filed: Nov. 23, 2020

(65) Prior Publication Data

US 2021/0222638 A1 Jul. 22, 2021

(30) Foreign Application Priority Data

Jan. 17, 2020 (JP) .............................. JP2020-005886

(51) Int. Cl.
*F02D 41/02* (2006.01)
*F01N 3/20* (2006.01)
*F01N 9/00* (2006.01)

(52) U.S. Cl.
CPC ....... *F02D 41/0255* (2013.01); *F01N 3/2013* (2013.01); *F01N 9/00* (2013.01); *F01N 9/005* (2013.01); *F01N 2560/06* (2013.01); *F01N 2900/0602* (2013.01); *F01N 2900/1602* (2013.01); *F02D 2200/0804* (2013.01)

(58) Field of Classification Search
CPC ......... F02D 41/0255; F02D 2200/0804; F01N 9/005; F01N 3/2013; F01N 9/00; F01N 2900/0602; F01N 2900/1602; F01N 2560/06
See application file for complete search history.

(56) References Cited

U.S. PATENT DOCUMENTS 8,751,187 B2 * 6/2014 Hirai ..................... F01N 3/2026
702/133

FOREIGN PATENT DOCUMENTS

JP 2008-57364 A 3/2008

* cited by examiner

*Primary Examiner* — Brandon D Lee
(74) *Attorney, Agent, or Firm* — Oblon, McClelland, Maier & Neustadt, L.L.P.

(57) ABSTRACT

A control device comprises a catalyst warmup control part configured to supply electric power to a conductive base to warm up a catalyst device. The catalyst warmup control part is provided with a first estimating part configured to estimate a temperature of the conductive base based on an engine operating state, a second estimating part configured to estimate a temperature of the conductive base based on a resistance value of the conductive base detected when supplying current to the conductive base, and an electric power control part configured to control an amount of electric power supplied to the conductive base when warming up the catalyst device based on a result of comparison of magnitudes of a first estimated temperature of the conductive base estimated by the first estimating part and a second estimated temperature of the conductive base estimated by the second estimating part.

11 Claims, 10 Drawing Sheets

CONTROL DEVICE FOR INTERNAL COMBUSTION ENGINE

FIELD

The present disclosure relates to a control device for an internal combustion engine.

BACKGROUND

PTL 1 (Japanese Unexamined Patent Publication No. 2008-057364) discloses a conventional control device for an internal combustion engine which is configured to calculate an estimated temperature of an exhaust purification system in accordance with an engine operating state and, when the estimated temperature of the exhaust purification system is lower than a predetermined target temperature, perform catalyst warmup control making the temperature of the exhaust purification system rise to the target temperature (specifically, control calculating the amount of heat required for making the temperature of the exhaust purification system rise to the target temperature based on the estimated temperature of the exhaust purification system and using a heating device to give that amount of heat to the exhaust purification system).

SUMMARY

As the method for calculating an estimated temperature of an exhaust purification system, in addition to the method of estimation in accordance with the engine operating state like in the above-mentioned PTL 1, for example, there is the method of estimation in accordance with a base resistance value of the exhaust purification system etc., but no matter which method is used for calculation, the estimated temperature will sometimes deviate from the actual temperature due to various factors. Further, the larger the deviation between the estimated temperature and the actual temperature, the greater the effect of the deviation on catalyst warmup control.

The present disclosure was made focusing on such a problem and has as its object to lessen the effect of any existing deviation between the estimated temperature of the exhaust purification system and the actual temperature on catalyst warmup control.

To solve this problem, an internal combustion engine according to one aspect of the present disclosure is provided with an engine body and an electric heating type of catalyst device provided in an exhaust passage of the engine body and supporting a catalyst on a conductive base generating heat by being supplied with current. The control device controlling this internal combustion engine is provided with a catalyst warmup control part supplying electric power to the conductive base to warm up the conductive base. The catalyst warmup control part is provided with a first estimating part estimating a temperature of the conductive base based on an engine operating state, a second estimating part estimating a temperature of the conductive base based on a resistance value of the conductive base detected when supplying current to the conductive base, and an electric power control part controlling an amount of electric power supplied to the conductive base when warming up the catalyst device based on a result of comparison of magnitudes of a first estimated temperature of the conductive base estimated by the first estimating part and a second estimated temperature of the conductive base estimated by the second estimating part.

According to this aspect of the present disclosure, the amount of electric power supplied to the conductive base is controlled based on the result of comparison of the two types of estimated temperatures of the conductive base estimated by different methods. For this reason, if there was deviation between an estimated temperature and an actual temperature of the conductive base, it is possible to ease the effect of that deviation on the catalyst warmup control.

DESCRIPTION OF EMBODIMENTS

Figure 1:
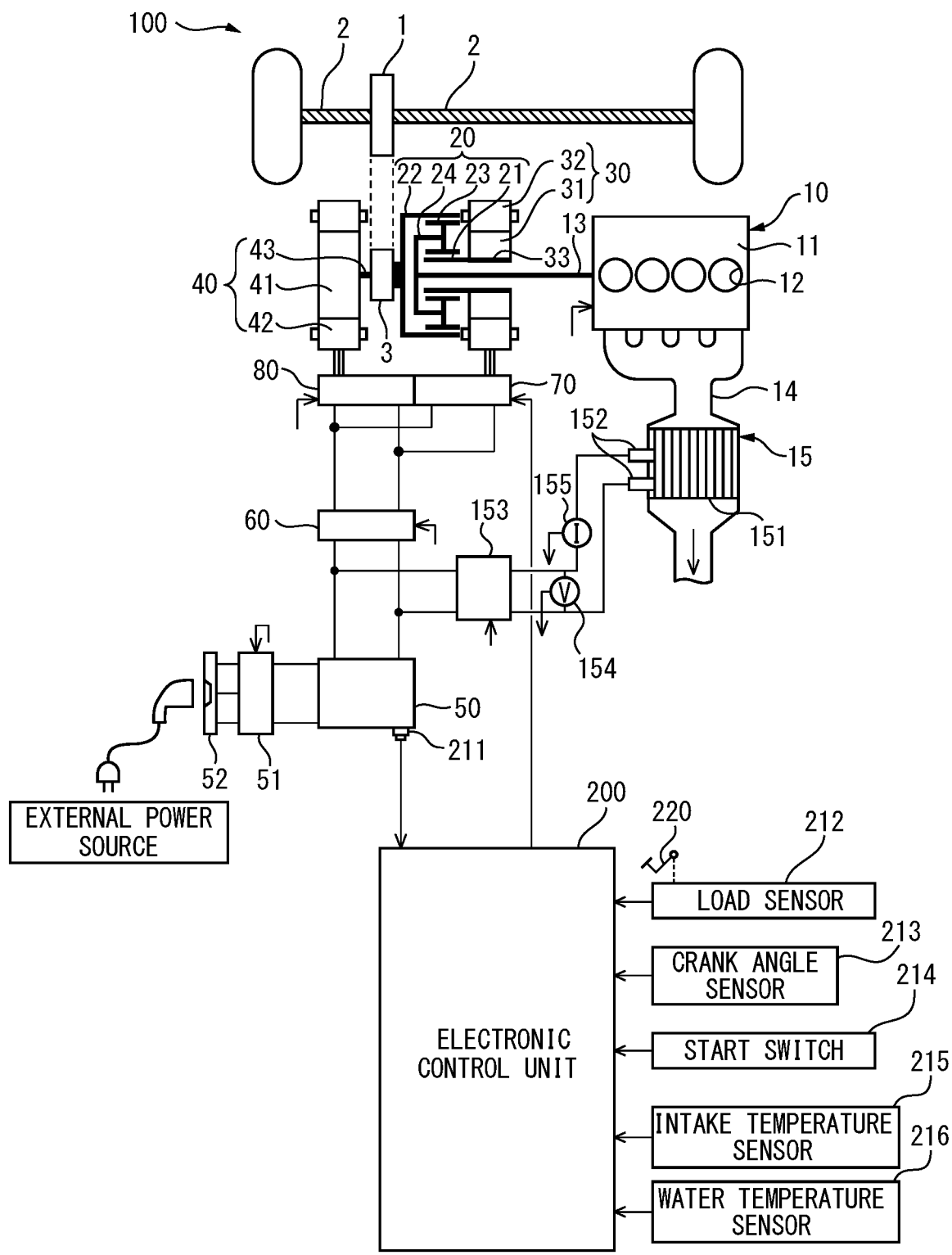
FIG. 1 is schematic view of the configuration of a vehicle according to a first embodiment of the present disclosure and an electronic control unit controlling the vehicle.

Below, embodiments of the present disclosure will be explained with reference to the drawings. Note that, in the following explanation, similar constituent elements are assigned the same reference numerals.

FIG. 1 is a schematic view of the configuration of a vehicle 100 and an electronic control unit 200 for controlling the vehicle 100 according to a first embodiment of the present disclosure.

The vehicle 100 according to the present embodiment is a hybrid vehicle provided with an internal combustion engine 10, power dividing mechanism 20, first rotary electric machine 30, second rotary electric machine 40, battery 50, boost converter 60, first inverter 70, and second inverter 80 and is configured to be able to transmit one or both drive powers of the internal combustion engine 10 and the second rotary electric machine 40 through a final speed reduction device 1 to a wheel drive shaft 2.

The internal combustion engine 10 makes fuel burn in cylinders 12 formed in the engine body 11 to generate drive power for making an output shaft 13 coupled to a crankshaft (not shown) rotate. The exhaust discharged from the cylinders 12 to an exhaust passage 14 flows through the exhaust passage 14 and is discharged into the atmosphere. The exhaust passage 14 is provided with an electrically heated catalyst device 15 for removing harmful substances in the exhaust.

The electrically heated catalyst device 15 is provided with a conductive base 151, a pair of electrodes 152, a voltage adjustment circuit 153, a voltage sensor 154, and a current sensor 155.

The conductive base 151 is for example formed from silicon carbide (SiC) or molybdenum disulfide ($MoSi_2$) or another material generating heat upon being supplied with current. The conductive base 151 is formed with a plurality of passages (below, "unit cells") of lattice shaped (or honeycomb shaped) cross-sections along the direction of flow of exhaust. The surfaces of the unit cells carry the catalyst. The catalyst carried at the conductive base 151 is not particularly limited. It is possible to suitably select the catalyst required for obtaining the desired exhaust purification performance from among various catalysts and make the conductive base 151 carry it.

The pair of electrodes 152 are parts for applying voltage to the conductive base 151. The pair of electrodes 152 are respectively electrically connected to the conductive base 151 and are connected through the voltage adjustment circuit 153 to the battery 50. By applying voltage to the conductive base 151 through the pair of electrodes 152, current flows through the conductive base 151 so the conductive base 151 generates heat and the catalyst carried on the conductive base 151 is heated.

The voltage $V_h(V)$ applied to the conductive base 151 by the pair of electrodes 152 (below, referred to as the "base applied voltage") can be adjusted by using the electronic control unit 200 to control the voltage adjustment circuit 153. For example, it is possible to apply the voltage of the battery 50 as it is or to apply the voltage of the battery 50 boosted or lowered to any voltage. In this way, in the present embodiment, by using the electronic control unit 200 to control the voltage adjustment circuit 153, it becomes possible to control the electric power $P_h(kW)$ supplied to the conductive base 151 (below, referred to as the "base supplied electric power") to any electric power.

The voltage sensor 154 detects the base applied voltage $V_h$. In the present embodiment, the voltage adjustment circuit 153 is controlled based on the base applied voltage $V_h$ detected by the voltage sensor 154 so that the base applied voltage $V_h$ becomes a predetermined rated voltage $V_{max}$.

The current sensor 155 detects the value of the current $I_h(A)$ flowing through the conductive base 151 when applying voltage to the conductive base 151. In the present embodiment, it detects the resistance value R ($\Omega$) of the conductive base 151 (below, referred to as the "base resistance value") based on the base applied voltage $V_h$ and the current value $I_h$.

The power division mechanism 20 is a planetary gear for dividing the power of the internal combustion engine 10 into two systems of the power for turning the wheel drive shaft 2 and power for driving the first rotary electrical machine 30 in a regeneration mode and is provided with a sun gear 21, ring gear 22, pinion gears 23, and a planetary carrier 24.

The sun gear 21 is an external gear and is arranged at the center of the power division mechanism 20. The sun gear 21 is connected with a shaft 33 of the first rotary electrical machine 30.

The ring gear 22 is an internal gear and is arranged around the sun gear 21 so as to become concentric with the sun gear 21. The ring gear 22 is connected with a shaft 33 of the second rotary electrical machine 40. Further, the ring gear 22 has integrally attached to it a drive gear 3 for transmitting rotation of the ring gear 22 to the wheel drive shaft 2 through the final deceleration device 1.

A pinion gear 23 is an external gear. A plurality are arranged between the sun gear 21 and ring gear 22 so as to mesh with the sun gear 21 and ring gear 22.

The planetary carrier 24 is connected to the output shaft 13 of the internal combustion engine 10 and rotates about the output shaft 13. Further, the planetary carrier 24 is also connected to the pinion gears 23 so as to enable the pinion gears 23 to revolve (orbit) around the sun gear 21 while individually rotating on their axes when the planetary carrier 24 rotates.

The first rotary electrical machine 30 is, for example, a three-phase AC synchronous type motor-generator and is provided with a rotor 31 attached to the outer circumference of the shaft 33 coupled with the sun gear 21 and having a plurality of permanent magnets embedded in its outer circumference and a stator 32 around which is wound an excitation coil generating a rotating magnetic field. The first rotary electrical machine 30 has the function of a motor receiving the supply of power from the battery 50 and being driven in a power running mode and the function of a generator receiving power from the internal combustion engine 10 and being driven in a regeneration mode.

In the present embodiment, the first rotary electrical machine 30 is mainly used as a generator. Further, when making the output shaft 13 rotate for cranking at the time of startup of the internal combustion engine 10, it is used as a motor and plays the role of a starter.

The second rotary electrical machine 40 is, for example, a three-phase AC synchronous type motor-generator. It is provided with a rotor 41 attached to the outer circumference of the shaft 43 connected to the ring gear 22 and having a plurality of permanent magnets embedded in its outer circumferential part and with a stator 42 around which an excitation coil generating a rotating magnetic field is wound. The second rotary electrical machine 40 has the function as a motor receiving the supply of power from a battery 50 and being driven in a power running mode and the function as a generator receiving power from the wheel drive shaft 2 and being driven in a regeneration mode at the time of deceleration of the vehicle etc.

The battery 50 is, for example, a nickel-cadmium storage battery or nickel-hydrogen storage battery, lithium ion battery, or other rechargeable secondary battery. In the present embodiment, as the battery 50, a lithium ion secondary battery with a rated voltage of 200V or so is used. The battery 50 is electrically connected through a boost converter 60 etc. to the first rotary electrical machine 30 and second rotary electrical machine 40 so as to enable charged power of the battery 50 to be supplied to the first rotary electrical machine 30 and second rotary electrical machine 40 and drive them in the power running mode and, further, so as to enable the generated power of the first rotary electrical machine 30 and second rotary electrical machine 40 to charge the battery 50.

Further, the battery 50 according to the present embodiment is, for example, configured to be able to be electrically connected to the external power source through the charging control circuit 51 and a charging lid 52 so that charging from a home electrical outlet or other external power source becomes possible. Therefore, the vehicle 100 according to the present embodiment is a so-called "plug-in hybrid vehicle". The charging control circuit 51 is an electrical circuit which can convert the AC current supplied from the external power source to DC current based on a control signal from the electronic control unit 200 and can boost the input voltage to the battery voltage and charge the electric power of the external power source to the battery 50.

The boost converter 60 is provided with an electrical circuit boosting the terminal voltage of the primary side terminal and outputting it from the secondary side terminal based on a control signal from the electronic control unit 200 and conversely lowering the terminal voltage of the secondary side terminal and outputting it from the primary side terminal based on a control signal from the electronic control unit 200. The primary side terminal of the boost converter 60 is connected to the output terminal of the battery 50, while the secondary side terminal is connected to the DC side terminals of the first inverter 70 and second inverter 80.

The first inverter 70 and second inverter 80 are provided with electrical circuits enabling them to convert direct currents input from the DC side terminals to alternating currents (in the present embodiment, three-phase alternating currents) and output them from the AC side terminals based on a control signal from the electronic control unit 200 and conversely to convert alternating currents input from the AC side terminals to direct currents and output them from the DC side terminals based on a control signal of the electronic control unit 200. The DC side terminal of the first inverter 70 is connected to the secondary side terminal of the boost converter 60, while the AC side terminal of the first inverter 70 is connected to the input/output terminal of the first rotary electrical machine 30. The DC side terminal of the second inverter 80 is connected to the secondary side terminal of the boost converter 60, while the AC side terminal of the second inverter 80 is connected to the input/output terminal of the second rotary electrical machine 40.

The electronic control unit 200 is a microcomputer provided with components connected to each other by a bidirectional bus such as a central processing unit (CPU), read only memory (ROM), random access memory (RAM), or other memory, input port, and output port.

The electronic control unit 200 receives as input the output signals from various types of sensors such as the above-mentioned voltage sensor 154 or current sensor 155 and also an SOC sensor 211 for detecting a state of charge of the battery SOC, a load sensor 212 generating an output voltage proportional to the amount of depression of an accelerator pedal 220, a crank angle sensor 213 generating an output pulse as a signal for calculating the engine speed etc. each time a crankshaft (not shown) of the engine body 11 rotates by, for example, 15°, a start switch 214 for judging startup and stopping of the vehicle 100, an intake temperature sensor 215 for detecting an intake temperature, and a water temperature sensor 216 for detecting an engine water temperature.

The electronic control unit 200 drives various control components to control the vehicle 100 based on output signals of various sensors which have been input etc. Below, the control of the vehicle 100 according to the present embodiment which the electronic control unit 200 performs will be explained.

The electronic control unit 200 makes the vehicle 100 run while switching the running mode to either an EV (electric vehicle) mode or CS (charge sustaining) mode based on the battery state of charge SOC. Specifically, the electronic control unit 200 sets the running mode of the vehicle 100 to the EV mode when the battery state of charge is larger than a predetermined mode switching state of charge SOC1 (for example, 10% of amount of full charge).

The EV mode is a mode preferentially utilizing the charged electric power of the battery 50 to drive the second rotating electrical machine 40 for powered operation and transmitting at least the power of the second rotating electrical machine 40 to the wheel drive shaft 2 to make the vehicle 100 run.

In the present embodiment, when the running mode is the EV mode, the electronic control unit 200 makes the internal combustion engine 10 stop and, in that state, uses the charged electric power of the battery 50 to make the second rotating electrical machine 40 be driven for powered operation and uses only the power of the second rotating electrical machine 40 to make the wheel drive shaft 2 rotate to make the vehicle 100 run. That is, when the running mode is the EV mode, the electronic control unit 200 makes the internal combustion engine 10 stop and, in that state, controls the output of the second rotating electrical machine 40 based on the running load to make the vehicle 100 run so that the output becomes the required output corresponding to the running load.

On the other hand, when the battery state of charge SOC is less than or equal to the mode switching state of charge SOC1, the electronic control unit 200 sets the running mode of the vehicle 100 to the C S (charge sustaining) mode.

The CS mode is a mode where the vehicle 100 is made to run so that the battery state of charge SOC is sustained at the battery state of charge when switched to the CS mode (below, "sustained state of charge").

Figure 2:
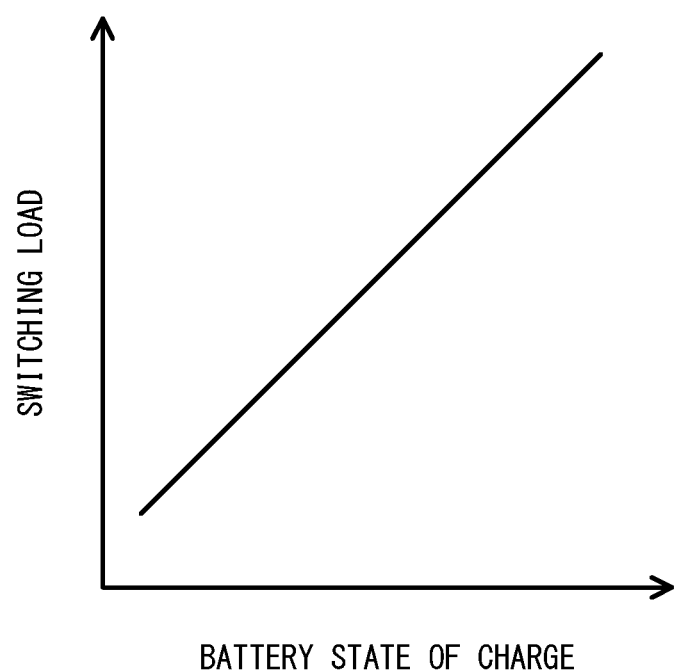
FIG. 2 is a view showing a relationship between a battery state of charge and a switching load.

When the running mode is the CS mode, the electronic control unit 200 makes the vehicle 100 run while further switching the running mode to either a CSEV mode or a CSHV mode. Specifically, when the running mode is the CS mode, the electronic control unit 200 sets the running mode to the CSEV mode if the running load is less than the switching load and sets the running mode to the CSHV mode if the running load is greater than or equal to the switching load. Further, as shown in FIG. 2, the electronic control unit 200 makes the switching load change in accordance with the battery state of charge SOC so that the switching load becomes smaller the smaller the battery state of charge SOC at the time.

The CSEV mode, like the above-mentioned EV mode, is a mode preferentially utilizing the charged electric power of the battery 50 to drive the second rotating electrical machine 40 for powered operation and transmitting at least the power of the second rotating electrical machine 40 to the wheel drive shaft 2 to make the vehicle 100 run. In the present embodiment, when the running mode is the CSEV mode, the electronic control unit 200 makes the internal combustion engine 10 stop and, in that state, uses the charged electric power of the battery 50 to drive the second rotating electrical machine 40 for powered operation and uses only the power of the second rotating electrical machine 40 to make the wheel drive shaft 2 rotate to make the vehicle 100 run.

On the other hand, the CSHV mode is the mode where the internal combustion engine 10 is made to operate, the generated electric power of the first rotating electrical machine 30 is preferentially utilized to drive the second rotating electrical machine 40 for powered operation, and the powers of both of the internal combustion engine 10 and the second rotating electrical machine 40 are transmitted to the wheel drive shaft 2 to make the vehicle 100 run. In the present embodiment, when the running mode is the CSHV mode, the electronic control unit 200 divides the power of the internal combustion engine 10 by the power dividing mechanism 20 into two systems, transmits one divided power of the internal combustion engine 10 to the wheel drive shaft 2, and uses the other power to drive the first rotating electrical machine 30 for regenerative operation. Further, basically, the generated electric power of the first rotating electrical machine 30 is used to drive the second rotating electrical machine 40 for powered operation and transmits the power of the second rotating electrical machine 40 in addition to the one power of the internal combustion engine 10 to the wheel drive shaft 2 to make the vehicle 100 run.

In this way, when the running mode is the CS mode, the electronic control unit 200 controls the outputs of the internal combustion engine 10 and the second rotating electrical machine 40 based on the battery state of charge SOC and the running load so that the output becomes the required output corresponding to the running load and makes the vehicle 100 run. The switching load when the battery state of charge SOC is the mode switching state of charge SOC1 is low, so while the vehicle is running, when the battery state of charge SOC falls to the mode switching state of charge SOC1 and the running mode switches from the EV mode to the CS mode, basically the internal combustion engine 10 is started. Therefore, the CS mode can also be said to be a running mode which is basically predicated on making the internal combustion engine 10 operate and which, under conditions of a poor heat efficiency of the internal combustion engine 10, can make the vehicle 100 run only by the output of the second rotating electrical machine 40.

Note that, when the running mode is the CS mode, the electronic control unit 200 uses the power of the internal combustion engine 10 to drive the first rotating electrical machine 30 for regenerative operation and uses the generated electric power of the first rotating electrical machine 30 to charge the battery 50 so that when the battery state of charge SOC becomes less than the sustained state of charge at the time the vehicle 100 is stopped, the battery state of charge becomes greater than or equal to the sustained state of charge.

Here, as explained above, the CS mode is a running mode basically predicated on making the internal combustion engine 10 operate. After the running mode is switched from the EV mode to the CS mode, basically the internal combustion engine 10 is started up. Further, the EV mode is switched to the CS mode according to the battery state of charge SOC. If the EV mode is switched to the CS mode and the internal combustion engine 10 is started up, the exhaust discharged from the cylinders 12 of the engine body 11 to the exhaust passage 14 flows through the exhaust passage 14 and is discharged into the atmosphere.

The harmful substances in the exhaust can be removed by the catalyst device 15 in the case where the catalyst device 15 finishes being warmed up, that is, in the case where the temperature of the conductive base 151 (below, referred to as the "catalyst bed temperature") becomes greater than or equal to a predetermined activation temperature T2 (for example, 500° C.) at which the exhaust purification function of the catalyst supported on the conductive base 151 starts to come into play.

On the other hand, right after starting up the internal combustion engine 10 and otherwise before the catalyst device 15 finishes being warmed up, if the catalyst bed temperature becomes greater than or equal to a predetermined activation start temperature T1 (for example, 300° C.) lower than the activation temperature T2, while the exhaust purification function of the catalyst supported on the conductive base 151 starts to come into play, the harmful substances in the exhaust cannot be sufficiently removed by the catalyst device 15, so the exhaust emission deteriorates. Therefore, to keep the exhaust emission from deteriorating after the engine is started up, it is desirable to start supplying current to the conductive base 151 during the EV mode to start warming up the catalyst device 15 and to finish warming up the catalyst device 15 before switching to the CS mode.

Therefore, in the present embodiment, when during the EV mode the battery state of charge SOC has fallen to a warmup start state of charge SOC2 larger than the mode switching state of charge SOC1, if the catalyst bed temperature is less than the activation start temperature T1, it is decided to start to supply current to the conductive base 151 to warm up the catalyst device 15. Due to this, the catalyst device 15 can finish being warmed up while the battery state of charge SOC is falling from the warmup start state of charge SOC2 to the mode switching state of charge SOC1, that is, in the EV mode between when switching from the EV mode to the CS mode.

Here, the catalyst bed temperature may conceivably, for example, be directly detected by attaching a temperature sensor to the conductive base 151, but there is the problem that it is difficult to attach a temperature sensor after sufficiently securing the insulation ability from the conductive base 151. For this reason, in the present embodiment, the catalyst bed temperature is basically estimated based on the engine operating state.

Below, first, referring to FIG. 3, the catalyst bed temperature estimation control based on the engine operating state according to the present embodiment will be explained. Note that, in the following explanation, for convenience, this catalyst bed temperature estimated by the catalyst bed temperature estimation control, that is, the catalyst bed temperature estimated based on the engine operating state, will be referred to as the "first estimated bed temperature Test1" and the actual catalyst bed temperature will be referred to as the "actual bed temperature Tact".

Figure 3:
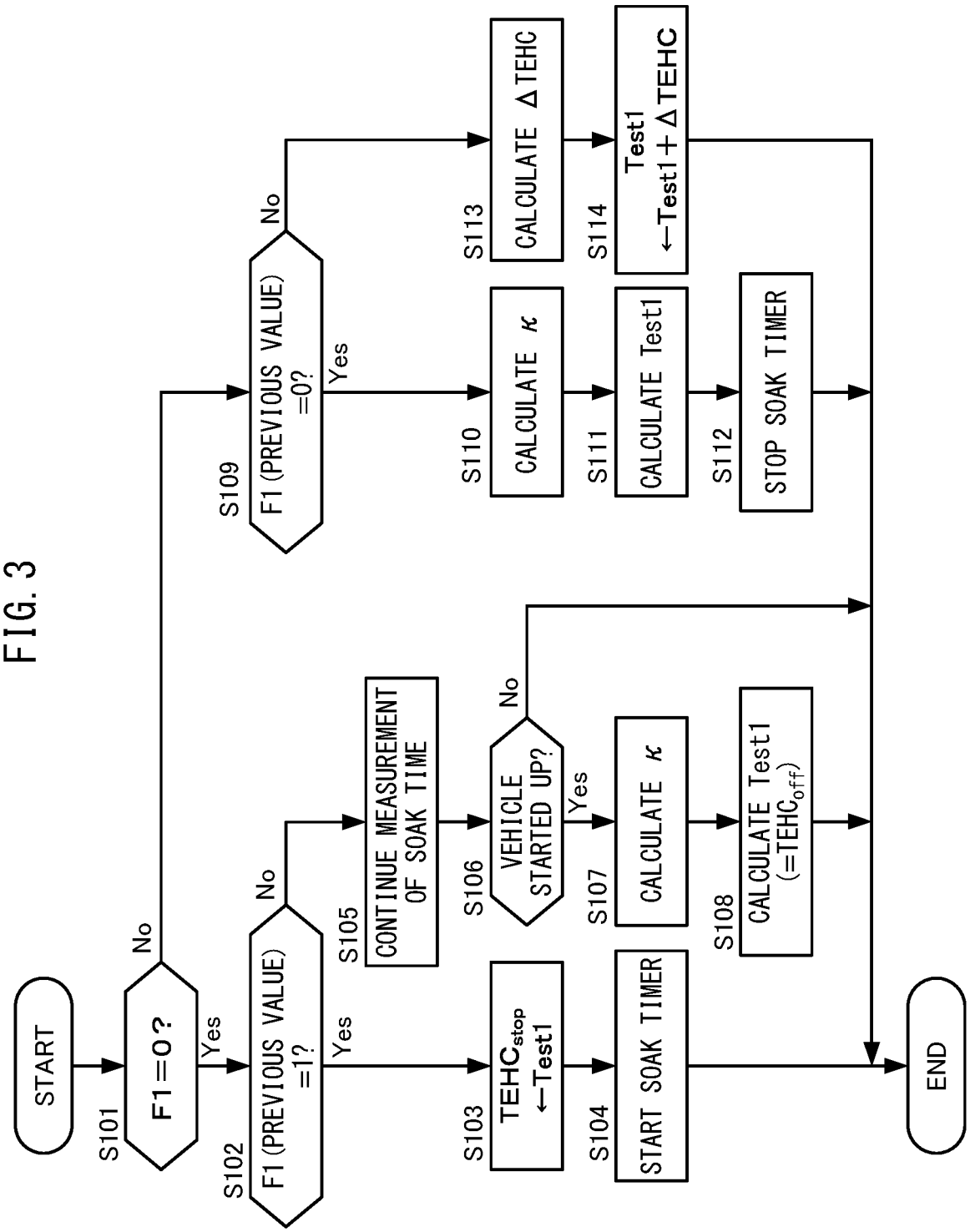
FIG. 3 is a flow chart explaining catalyst bed temperature estimation control based on an engine operating state according to the first embodiment of the present disclosure.

FIG. 3 is a flow chart explaining the catalyst bed temperature estimation control based on the engine operating state according to the present embodiment. The electronic control unit 200 repeatedly performs the present routine by a predetermined processing period (for example, 10 ms).

FIG. 3 is a flow chart explaining the catalyst bed temperature estimation control according to the present embodiment. The electronic control unit 200 repeatedly performs the present routine by a predetermined processing period (for example, 10 ms).

At step S101, the electronic control unit 200 reads in an engine operation flag F1 and judges whether the engine operation flag F1 has been set to "0". The engine operation flag F1 is a flag which is set separately from the present routine and a flag which is set to "1" when making the internal combustion engine 10 start up and which is returned to "0" when making the internal combustion engine 10 stop. The initial value is set to "0". If the engine operation flag F1 is "0", the electronic control unit 200 proceeds to the processing of step S102. On the other hand, if the engine operation flag F1 is "1", the electronic control unit 200 proceeds to the processing of step S109.

At step S102, the electronic control unit 200 judges whether a previous value of the engine operation flag F1 is "1", that is, whether the time is right after stopping the engine (whether it is the first processing after stopping the engine). If the previous value of the engine operation flag F1 is "1", that is, if the time is right after stopping the engine, the electronic control unit 200 proceeds to the processing of step S103. On the other hand, if the previous value of the engine operation flag F1 is not "1", that is, the time is while stopping the engine, the electronic control unit 200 proceeds to the processing of step S105.

At step S103, the electronic control unit 200 stores the first estimated bed temperature Test1 currently stored in the memory (the first estimated bed temperature Test1 estimated while stopping the engine and stored in the memory at the later explained step S114) as the catalyst bed temperature $TEHC_{stop}$ after stopping the engine (right after stopping the engine) in a separate memory.

At step S104, the electronic control unit 200 starts up a soak timer measuring the elapsed time from when the internal combustion engine 10 is stopped (below, referred to as the "soak time") and starts measuring the soak time.

At step S105, the electronic control unit 200 continues to measure the soak time by the soak timer.

At step S106, the electronic control unit 200 judges whether the vehicle 100 has been started up, that is, whether the start switch 214 has become the ON state. If the vehicle 100 is started up, the electronic control unit 200 proceeds to the processing of step S107. On the other hand, if the vehicle 100 has not been started up (if the start switch 214 is in the OFF state), the electronic control unit 200 ends the current processing.

Figure 4:
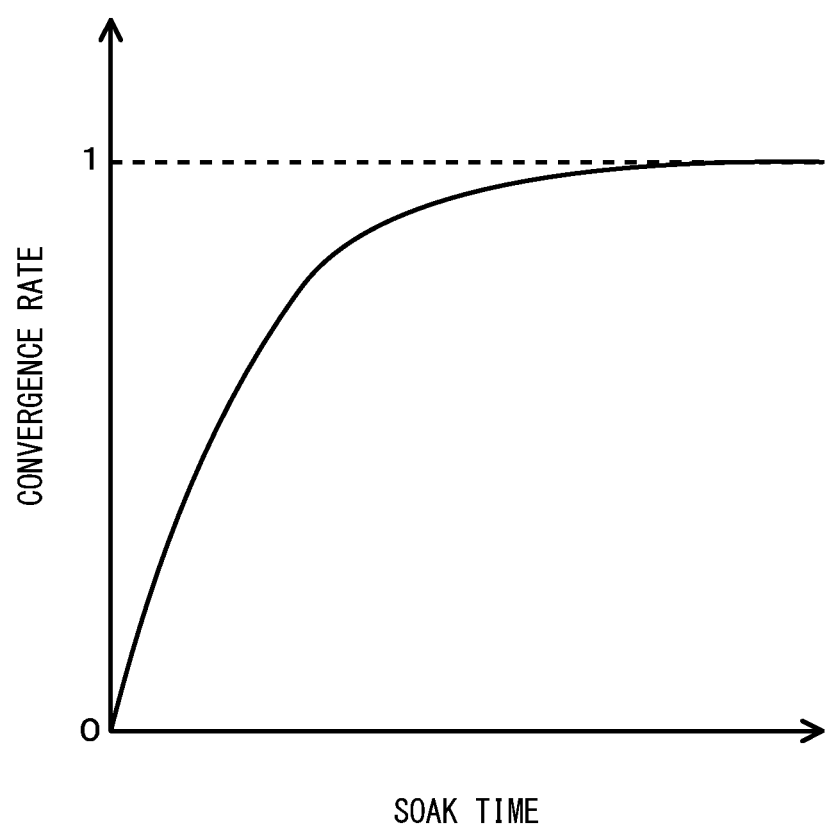
FIG. 4 is a map for calculating a convergence rate K of a catalyst bed temperature to an outside air temperature based on a soak time.

At step S107, since, while stopping the engine, the catalyst bed temperature gradually converges to the outside air temperature in accordance with the time elapsed from when the internal combustion engine 10 was stopped, that is, the soak time, the electronic control unit 200 refers to the graph shown in FIG. 4 set in advance by experiments etc. and calculates the convergence rate K of the catalyst bed temperature to the outside air temperature based on the soak time. As shown in FIG. 4, the convergence rate K takes a value from 0 to 1. When the convergence rate K is 1, it shows that the catalyst bed temperature has converged to a temperature the same as the outside air temperature.

At step S108, the electronic control unit 200 enters into the following formula (1) the catalyst bed temperature $TEHC_{stop}$ at the time of stopping the engine and the intake temperature (outside air temperature) TIN to calculate the current first estimated bed temperature Test1 (that is, the estimated value of the catalyst bed temperature while stopping the engine) and stores that first estimated bed temperature Test1 in the memory. Below, the first estimated bed temperature Test1 calculated at this step S107 and stored in the memory will be referred to as the "catalyst bed temperature $TEHC_{off}$ while stopping the engine" in accordance with need.

[Mathematical 1]

$$Test1 = TEHC_{stop} + (TIN - TEHC_{stop}) \times \kappa \qquad (1)$$

At step S109, the electronic control unit 200 judges whether the previous value of the engine operation flag F1 was "0", that is, whether the time is right after starting up the engine (whether it is the first processing after starting up the engine). If the previous value of the engine operation flag F1 was "0", that is, if the time is right after starting up the engine, the electronic control unit 200 proceeds to the processing of step S110. On the other hand, if the previous value of the engine operation flag F1 was "1", that is, if the time is while the engine is operating, the electronic control unit 200 proceeds to the processing of step S113.

At step S110, the electronic control unit 200 refers to the above-mentioned map of FIG. 4 and calculates the convergence rate K based on the soak time.

At step S111, the electronic control unit 200 enters into the above-mentioned formula (1) the catalyst bed temperature $TEHC_{stop}$ at the time of stopping the engine and the intake temperature (≈the outside air temperature) TIN to calculate the current first estimated bed temperature Test1 (that is, the estimated value of the catalyst bed temperature at the time of startup of the engine (right after starting up the engine)) and stores the first estimated bed temperature Test1 in the memory.

At step S112, the electronic control unit 200 returns the soak time to "0" to stop the soak timer.

At step S113, the electronic control unit 200 reads in the detected values of the various types of estimation use parameters for estimating the catalyst bed temperature while the engine is operating and calculates the amount of change of temperature ΔTEHC of the catalyst bed temperature per unit time (processing period) based on the detected values of the estimation parameters. The catalyst bed temperature TEHC while the engine is operating changes by being affected by the heat of exhaust, so, for example, it is possible to suitably select one or more parameters from the engine speed, engine load, engine water temperature, intake amount, intake temperature, and other parameters affecting the amount of heat energy of the exhaust and use them as the estimation use parameters.

At step S114, the electronic control unit 200 adds the amount of change of temperature ΔTEHC to the first estimated bed temperature Test1 stored in the memory to update the first estimated bed temperature Test1 and stores the updated first estimated bed temperature Test1 in the memory.

In this way, in the present embodiment, the catalyst bed temperature is basically estimated based on the engine operating state, but sometimes various factors cause deviation to occur between the actual bed temperature Tact and the first estimated bed temperature Test1.

For example, sometimes the memory is initialized due to the battery being drained, the battery being replaced, etc. If the memory is initialized, the value of the catalyst bed temperature $TEHC_{stop}$ when stopping the engine or the soak time stored in the memory is sometimes returned to a preset initial value (for example, if the catalyst bed temperature $TEHC_{stop}$ when stopping the engine, 20° C. corresponding to ordinary temperature, while if the soak time, 0 s etc.) Further, sometimes the electronic control unit 200 experiences some sort of problem resulting in the soak timer not being started up and the soak time remaining at the initial value or the intake temperature sensor 215 experiences some sort of problem resulting in the value of the intake temperature TIN being an abnormal value.

The catalyst bed temperature $TEHC_{stop}$ when stopping the engine, the soak time used for calculation of the convergence rate K, and the intake temperature TIN are parameters required when calculating the first estimated bed temperature Test1 in accordance with the above-mentioned formula (1). For this reason, when these parameters are returned to the initial values and otherwise exhibit abnormal values, deviation occurs between the actual bed temperature Tact and the first estimated bed temperature Test1.

Further, while not cases of these parameters exhibiting abnormal values, changes in the amount of heat discharged from the conductive base 151 due to the meteorological conditions (air temperature, rain, snow, wind, etc.) or the effects of cooling due to washing the vehicle etc. sometimes cause unexpected deviation between the actual bed temperature Tact and the first estimated bed temperature Test1. In the same way, if the start switch 214 repeatedly turns on and off in a short time period, that is, if short trips in which the vehicle runs only in the EV mode are repeatedly made etc., the running wind sometimes unexpectedly causes deviation between the actual bed temperature Tact and the first estimated bed temperature Test1.

Further, if the deviation between the actual bed temperature Tact and the first estimated bed temperature Test1 becomes larger, the following such problem arises.

That is, in the present embodiment, if during the EV mode the first estimated bed temperature Test1 when the battery state of charge SOC falls to the warmup start state of charge SOC2 is less than the activation start temperature T1, basically, the first estimated bed temperature Test1 at that time is made the initial temperature T0, the amount of heat Q (J) required for making the catalyst bed temperature rise from the initial temperature T0 to the activation temperature T2, that is, the target amount of electric power tWh (Ws), is calculated, and current is supplied to the conductive base 151 so that the amount of electric power Wh supplied to the conductive base 151 becomes the target amount of electric power tWh.

For this reason, if the first estimated bed temperature Test1 was lower than the actual bed temperature Tact, the conductive base 151 ends up being heated more than necessary, so if the deviation between the actual bed temperature Tact and the first estimated bed temperature Test1 is large, overheating is liable to cause the conductive base 151 to end up deteriorating.

Here, as the method for estimating the catalyst bed temperature, in addition to the method of estimating the catalyst bed temperature based on the engine operating state, there is the method of utilizing the temperature-resistance characteristic of the conductive base 151, specifically, the temperature characteristic of the resistance value falling the more the temperature rises (negative temperature coefficient) to estimate the catalyst bed temperature based on the base resistance value R detected when supplying current to the conductive base 151.

Therefore, in the present embodiment, it was decided to compare the first estimated bed temperature Test1 calculated at any time at the time of start of warmup based on the engine operating state and the estimated value of the catalyst bed temperature Test2 calculated based on the base resistance value R (below, referred to as the "second estimated bed temperature") to confirm the reliability of the first estimated bed temperature Test1 (degree of reliability). Further, it was decided to correct the target amount of electric power tWh based on the result of comparison in accordance with need and warm up the catalyst device 15 by electric heating. Below, referring to FIG. 5, this catalyst warmup control according to the present embodiment will be explained.

Figure 5:
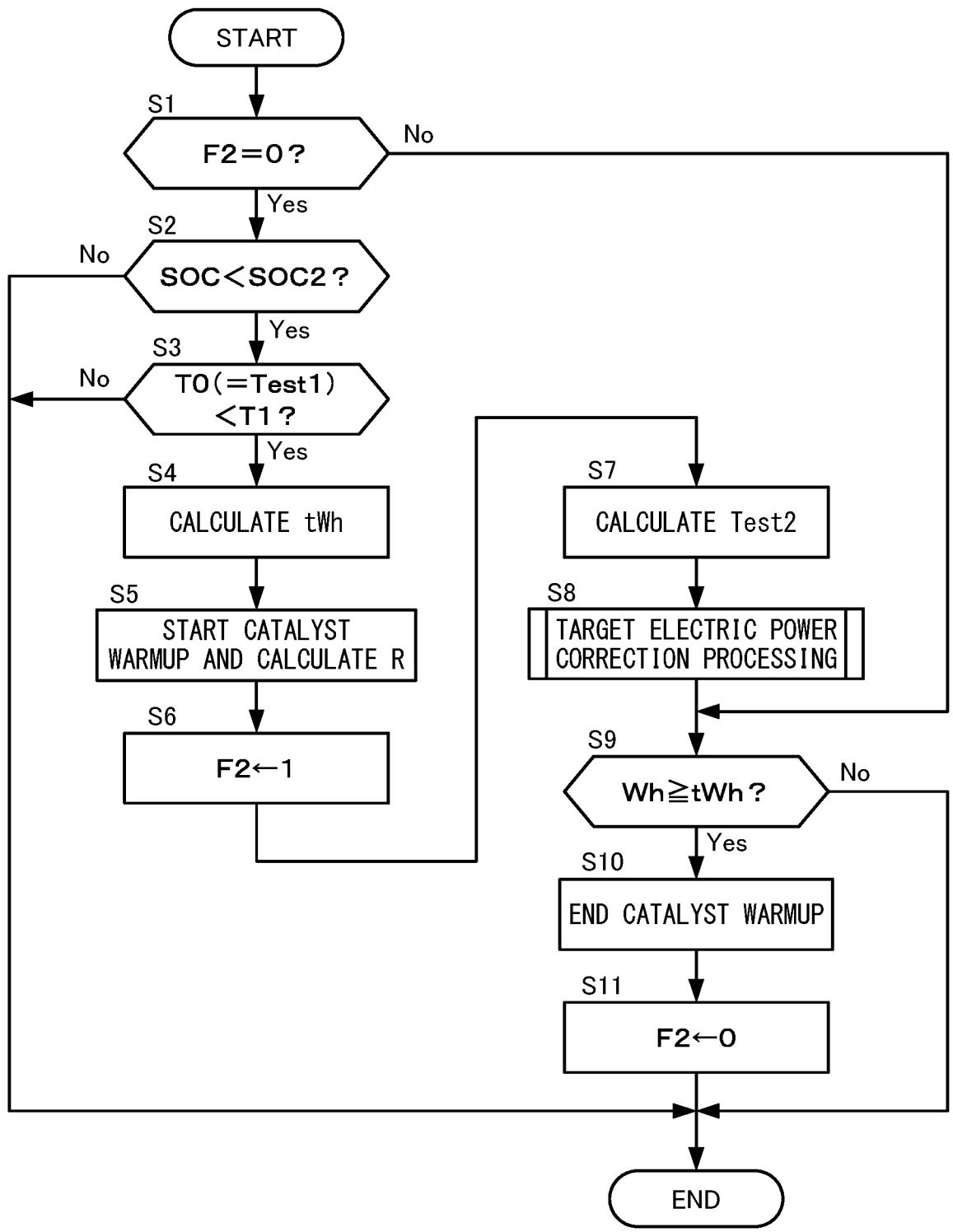
FIG. 5 is a flow chart explaining catalyst warmup control according to the first embodiment of the present disclosure.

FIG. 5 is a flow chart explaining catalyst warmup control according to the present embodiment. The electronic control unit 200 repeatedly performs the present routine by a predetermined processing period (for example, 10 ms).

At step S1, the electronic control unit 200 judges whether a catalyst warmup start flag F2 has been set to "0". The catalyst warmup start flag F2 is a flag set to "1" when starting to warm up the catalyst device 15. The initial value is set to "0". If the catalyst warmup start flag F2 is "0", the electronic control unit 200 proceeds to the processing of step S2. On the other hand, if catalyst warmup start flag F2 is "1", the electronic control unit 200 proceeds to the processing of step S9.

At step S2, the electronic control unit 200 judges whether the battery state of charge SOC is less than the warmup state of charge SOC2. If the battery state of charge SOC is less than the warmup state of charge SOC2, the electronic control unit 200 proceeds to the processing of step S3. On the other hand, if the battery state of charge SOC is greater than or equal to warmup state of charge SOC2, the electronic control unit 200 ends the current processing.

At step S3, the electronic control unit 200 reads in the first estimated bed temperature Test1 calculated at any time based on the engine operating state as the initial temperature T0 and judges whether the initial temperature T0 is less than the activation start temperature T1. If the initial temperature T0 is less than the activation start temperature T1, the electronic control unit 200 proceeds to the processing of step S4. On the other hand, if the initial temperature T0 is greater than or equal to the activation start temperature T1, the exhaust purification function of the catalyst has started to come into play, so the electronic control unit 200 ends the current processing. Note that, in the present embodiment, in the present step, it was decided to judge whether the initial temperature T0 is less than the activation start temperature T1, then proceed to the processing of step S4 or end the current processing, but it is also possible to decide to judge whether the initial temperature T0 is less than the activation temperature T2 and proceed to the processing of step S4 or end the current processing.

At step S4, the electronic control unit 200 calculates the target amount of electric power tWh required for making the catalyst bed temperature T rise from the initial temperature T0 to the activation temperature T2 based on the following formula (2). Note that, C in formula (2) is the heat capacity of the conductive base 151 and can be calculated in advance by experiments etc.

[Mathematical 2]

$$tWh = C \times (T2 - T0) \quad (2)$$

At step S5, the electronic control unit 200 starts to supply current to the conductive base 151 to warm up the catalyst device 15. In the present embodiment, the electronic control unit 200 controls the voltage adjustment circuit 153 so that the base applied voltage $V_h$ becomes a rated voltage $V_{max}$ so as to start warming up the catalyst device 15. At this time, the electronic control unit 200 also calculates the base resistance value R based on the base applied voltage $V_h(=V_{max})$ detected by the voltage sensor 154 and the base current value $I_h$ detected by the current sensor 155 and stores that base resistance value R in the memory.

At step S6, the electronic control unit 200 sets the catalyst warmup start flag F2 to "1".

Figure 6:
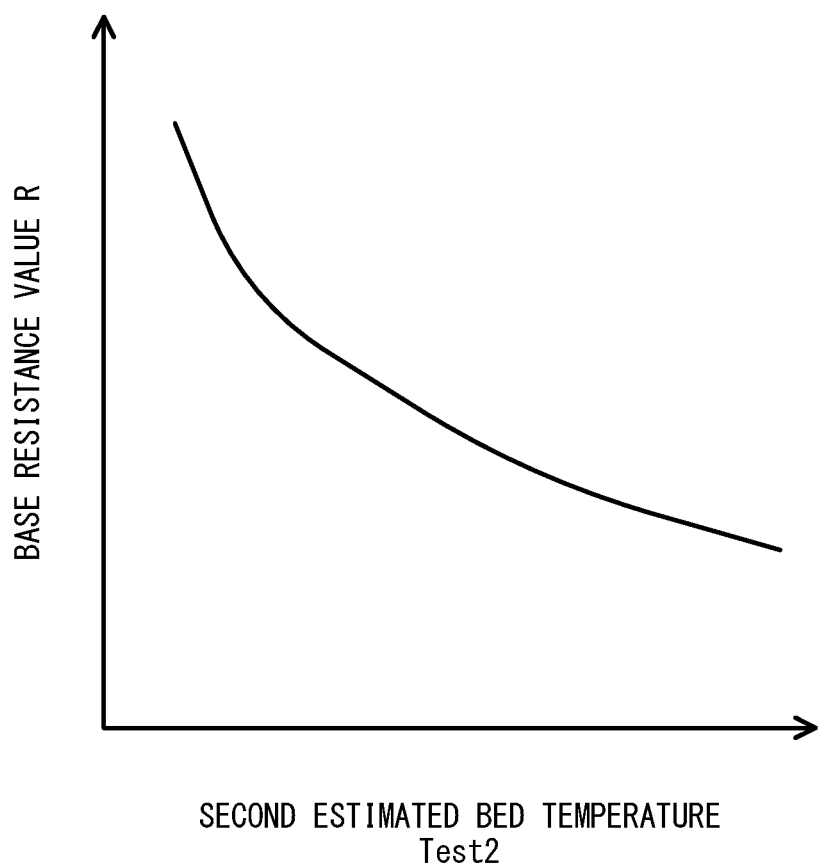
FIG. 6 is a graph for calculating a base resistance value based on a second estimated bed temperature.

At step S7, the electronic control unit 200 refers to the graph of FIG. 6 prepared in advance by experiments etc. and calculates the second estimated bed temperature Test2 based on the base resistance value R at the time of starting warmup (at the time of starting supplying current) stored in the memory at step S5.

At step S8, the electronic control unit 200 performs target electric power correction processing. Details of the target electric power correction processing will be explained later referring to FIG. 7.

At step S9, the electronic control unit 200 judges whether the cumulative value of the base supplied electric power $P_h$ (=base applied voltage $V_h \times$ base current value $I_h$) from starting to warm up the catalyst device 15, that is, the amount of electric power Wh supplied to the conductive base 151, becomes greater than or equal to the target amount of electric power tWh. If the amount of electric power Wh supplied to the conductive base 151 becomes greater than or equal to the target amount of electric power tWh, the electronic control unit 200 proceeds to the processing of step S10. On the other hand, if the amount of electric power Wh supplied to the conductive base 151 is less than the target amount of electric power tWh, the electronic control unit 200 ends the current processing.

At step S10, the electronic control unit 200 stops supplying current to the conductive base 151 to end warmup of the catalyst device 15.

At step S11, the electronic control unit 200 returns the catalyst warmup start flag F2 to "0".

Figure 7:
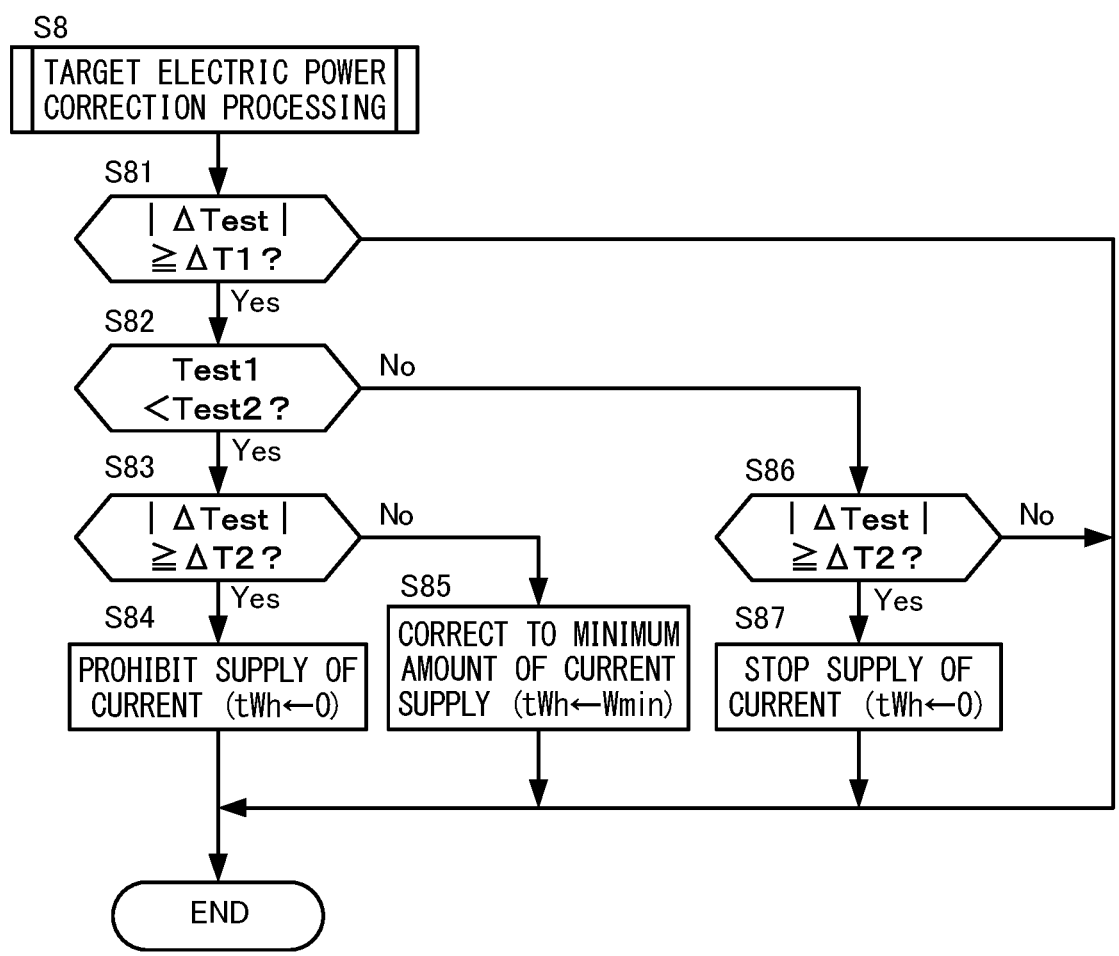
FIG. 7 is a flow chart explaining details of target electric power correction processing according to the first embodiment of the present disclosure.

FIG. 7 is a flow chart explaining details of the target electric power correction processing.

At step S81, the electronic control unit 200 judges whether the absolute value of the difference ΔTest between the first estimated bed temperature Test1 read in as the initial temperature T0 at step S3 and the second estimated bed temperature Test2 calculated at step S7 (below, referred to as the "amount of deviation of estimated values") is greater than or equal to a predetermined first amount of deviation ΔT1. The first amount of deviation ΔT1 is made a value enabling judgment that the deviation between the first estimated bed temperature Test1 and the second estimated bed temperature Test2 is, for example, within a range of error or otherwise within an allowable range. In the present embodiment, it is made 30° C.

If the absolute value of the amount of deviation of estimated values ΔTest is greater than or equal to the first amount of deviation ΔT1, the electronic control unit 200 judges that deviation which cannot be deemed error occurs between the first estimated bed temperature Test1 and the second estimated bed temperature Test2 and proceeds to the processing of step S82. On the other hand, if the absolute value of the amount of deviation of estimated values ΔTest is less than the first amount of deviation ΔT1, the electronic control unit 200 ends the current processing without correcting the target amount of electric power tWh.

At step S82, the electronic control unit 200 judges whether the first estimated bed temperature Test1 is lower than the second estimated bed temperature Test2. If the first estimated bed temperature Test1 is lower than the second estimated bed temperature Test2, the electronic control unit 200 proceeds to the processing of step S83. On the other hand, if the first estimated bed temperature Test1 is higher than the second estimated bed temperature Test2, the electronic control unit 200 proceeds to the processing of step S86.

At step S83 and at step S86, the electronic control unit 200 judges whether the absolute value of the amount of deviation of estimated values ΔTest is greater than or equal to the second amount of deviation ΔT2 larger than the first amount of deviation ΔT1.

Figure 8:
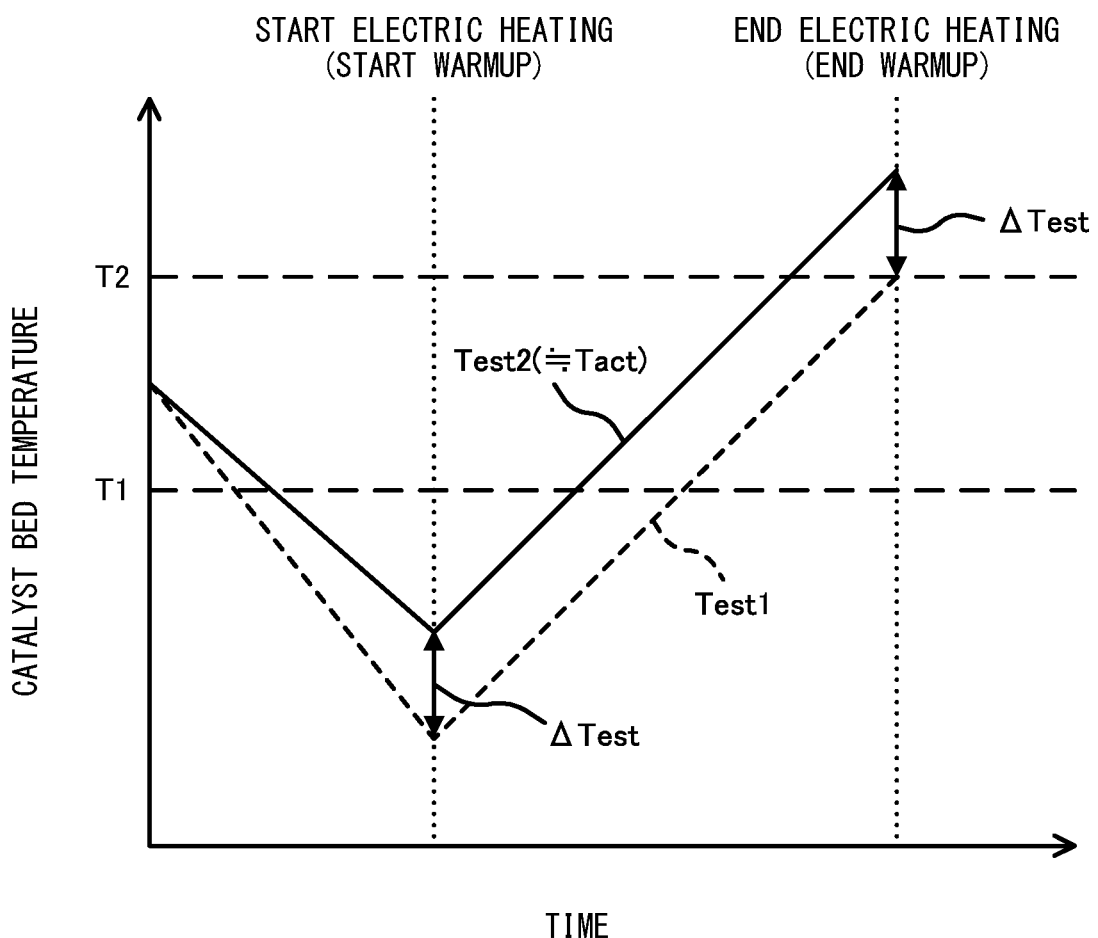
FIG. 8 is a view showing an example of change of an actual bed temperature when warming up a catalyst device if the first estimated bed temperature diverges from the actual bed temperature.
Figure 9:
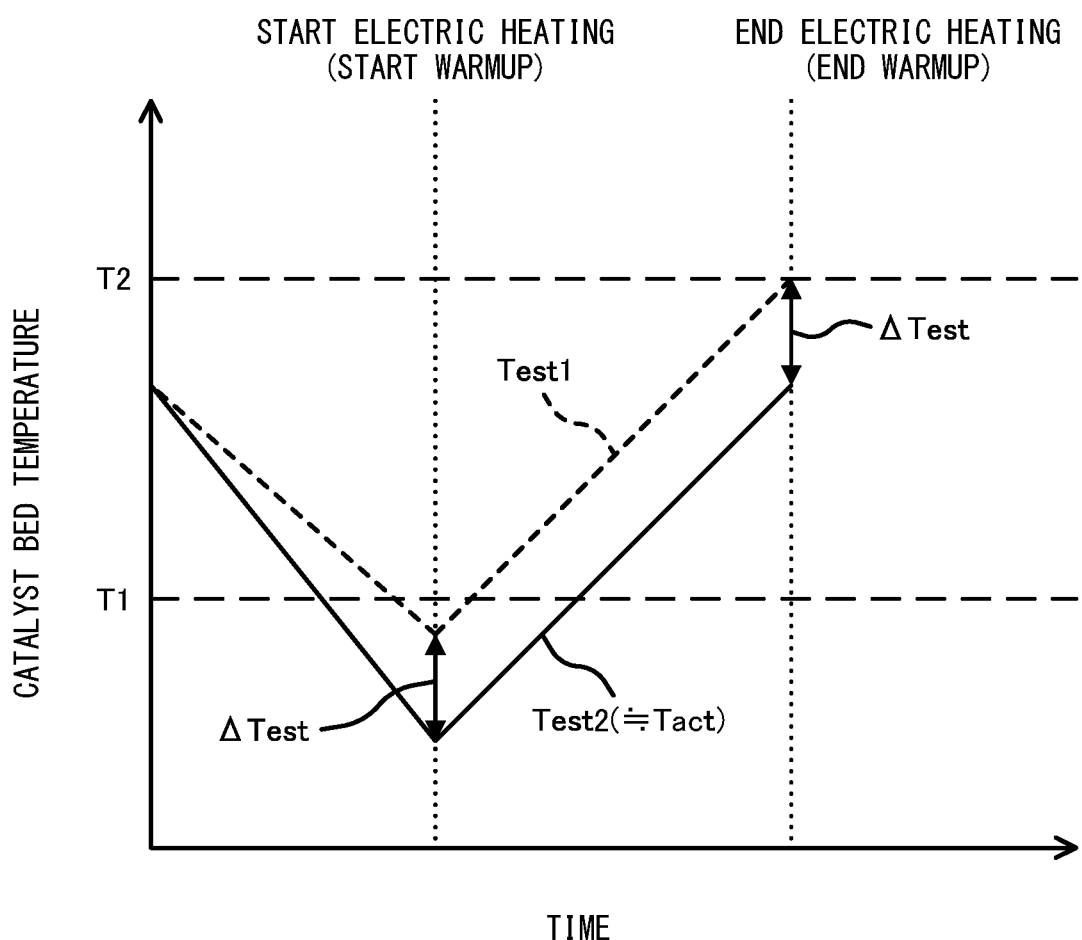
FIG. 9 is a view showing an example of change of the actual bed temperature when warming up the catalyst device if the first estimated bed temperature diverges from the actual bed temperature.

Here, even if the second estimated bed temperature Test2 and the actual bed temperature Tact had generally matched and the first estimated bed temperature Test1 diverged from the actual bed temperature Tact, if supplying the target amount of electric power tWh calculated at the abovementioned step S4 to the conductive base 151 to warm up the catalyst device 15, as shown in FIG. 8 and FIG. 9, deviation occurs in the amount of deviation of estimated values ΔTest between the actual bed temperature Tact after the end of warmup and the activation temperature T2.

Specifically, as shown in FIG. 8, in the case where the first estimated bed temperature Test1 had become lower than the second estimated bed temperature Test2, the actual bed temperature Tact after the end of warmup becomes higher than the activation temperature T2 by exactly the amount of deviation of estimated values ΔTest. Further, as shown in FIG. 9, if the first estimated bed temperature Test1 had become higher than the second estimated bed temperature Test2, the actual bed temperature Tact after the end of warmup becomes lower than the activation temperature T2 by exactly the amount of deviation of estimated values ΔTest.

As shown in FIG. 8, in the case where the first estimated bed temperature Test1 had become lower than the second estimated bed temperature Test2, the actual bed temperature Tact after the end of warmup is liable to become higher than the activation temperature T2 by exactly the amount of deviation of estimated values ΔTest. Therefore, if the absolute value of the amount of deviation of estimated values ΔTest becomes larger, the actual bed temperature Tact after the end of warmup is liable to end up becoming higher than a guaranteed heat resistance temperature T3 of the conductive base 151 (below, referred to as the "base guaranteed heat resistance temperature") (for example, 650° C.). For this reason, overheating is liable to end up promoting deterioration of the conductive base 151 and to lower the durability of the conductive base 151.

Therefore, in the present embodiment, the second amount of deviation ΔT2 was made a value smaller than the value corresponding to the temperature difference between the base guaranteed heat resistance temperature T3 and the activation temperature T2 by exactly an amount of a predetermined safety margin (for example, 100° C.).

Further, if the absolute value of the amount of deviation of estimated values ΔTest is greater than or equal to the second amount of deviation ΔT2, when the first estimated bed temperature Test1 was lower than the second estimated bed temperature Test2, overheating is liable to end up causing the conductive base 151 to fall in durability, so it was decided to proceed to the processing of step S84, correct the target amount of electric power tWh to zero, and prohibit the supply of current to the conductive base 151 across the board.

Further, in the case where the absolute value of the amount of deviation of estimated values ΔTest is less than the second amount of deviation ΔT2, even if supplying the target amount of electric power tWh calculated at step S4 to the conductive base 151 to warm up the catalyst device 15, there is little possibility of the actual bed temperature Tact after the end of warmup ending up becoming higher than the base guaranteed heat resistance temperature T3, but to reliably prevent overheating of the conductive base 151, it was decided to proceed to the processing of step S85 and correct the target amount of electric power tWh across the board to an amount of electric power smaller than the target amount of electric power tWh calculated at step S4. Specifically, in the present embodiment, it was decided to correct the target amount of electric power tWh to a predetermined minimum amount of electric power Wmin set in advance. The minimum amount of electric power Wmin was made an amount of electric power required for raising the catalyst bed temperature from the activation start temperature T1 to the activation temperature T2. Due to this, it is possible to reliably prevent overheating of the conductive base 151 while keeping the exhaust emission from deteriorating after engine startup as much as possible.

On the other hand, in the case where, as shown in FIG. 9, the first estimated bed temperature Test1 was higher than the second estimated bed temperature Test2, even if the second estimated bed temperature Test2 and the actual bed temperature Tact generally match, there is a low possibility of the actual bed temperature Tact after the end of warmup ending up becoming higher than the base guaranteed heat resistance temperature T3. However, there is also a possibility of both of the first estimated bed temperature Test1 and the second estimated bed temperature Test2 diverging from the actual bed temperature Tact. Further, the time when the absolute value of the amount of deviation of estimated values ΔTest is greater than or equal to the second amount of deviation ΔT2 means, in other words, the time when both the first estimated bed temperature Test1 and the second estimated bed temperature Test2 are low in reliability and the time when the actual bed temperature Tact cannot be accurately grasped. At such a time, supplying current to the conductive base 151 is not suitable.

Therefore, in the present embodiment, in the case where the first estimated bed temperature Test1 is higher than the second estimated bed temperature Test2, when the absolute value of the amount of deviation of estimated values ΔTest was greater than or equal to the second amount of deviation ΔT2, it was decided to proceed to the processing of step S87 and to correct the target amount of electric power tWh to zero to prohibit supply of current to the conductive base 151 across the board.

Further, in the case where the first estimated bed temperature Test1 is higher than the second estimated bed temperature Test2, when the absolute value of the amount of deviation of estimated values ΔTest was less than the second amount of deviation ΔT2, even if supplying the target amount of electric power tWh calculated at step S4 to the conductive base 151 to warm up the catalyst device 15, there is an extremely low possibility of the actual bed temperature Tact after the end of warmup ending up becoming higher than the base guaranteed heat resistance temperature T3, so it was decided to end the current processing without correcting the target amount of electric power tWh.

The internal combustion engine 10 according to the present embodiment explained above is provided with the engine body 11 and the electric heating type of catalyst device 15 provided in the exhaust passage 14 of the engine body 11 and supporting a catalyst on the conductive base 151 generating heat upon being supplied with current. The electronic control unit 200 (control device) for controlling this internal combustion engine 10 is provided with a catalyst warmup control part supplying electric power to the conductive base 151 to warm up the catalyst device 15.

Further, the catalyst warmup control part is provided with a first estimating part estimating the temperature of the conductive base 151 based on the engine operating state, a second estimating part estimating the temperature of the conductive base 151 based on the resistance value of the conductive base 151 detected when supplying current to the conductive base 151, and an electric power control part controlling an amount of electric power supplied to the conductive base 151 when warming up the catalyst device 15 based on results of comparison comparing magnitudes of the first estimated bed temperature Test1 (first estimated temperature) of the conductive base 151 estimated by the first estimating part and the second estimated bed temperature Test2 (second estimated temperature) of the conductive base 151 estimated by the second estimating part.

Therefore, according to the present embodiment, the amount of electric power supplied to the conductive base is controlled based on the results of comparison of the two types of estimated bed temperatures estimated by different methods (first estimated bed temperature Test1 and second estimated bed temperature Test2). For this reason, even if the first estimated bed temperature Test1 and the actual bed temperature Tact calculated based on the engine operating state deviate, the effect of that deviation on the catalyst warmup control can be eased.

Note that, the electric power control part according to the present embodiment is configured so that when the absolute value of the amount of deviation of estimated values ΔTest comprised of the difference between the first estimated bed temperature Test1 and the second estimated bed temperature Test2 is greater than or equal to the second amount of deviation ΔT2 (predetermined value), it prohibits the supply of current to the conductive base 151.

Due to this, when the deviation between the two types of estimated bed temperatures estimated by different methods is large and the estimated bed temperatures are low in reliability, the supply of current to the conductive base 151 is prohibited, so overheating of the conductive base 151 can be reliably prevented.

Further, the electric power control part according to the present embodiment is provided with a target electric power calculating part calculating a target amount of electric power tWh required for making the temperature of the conductive base 151 rise from the first estimated bed temperature Test1 to the predetermined activation temperature T2 (warmup completion temperature) and a correcting part correcting the target amount of electric power based on an amount of deviation of estimated values ΔTest comprised of the difference between the first estimated bed temperature Test1 and the second estimated bed temperature Test2.

Further, the correcting part is configured so that when the absolute value of the amount of deviation of estimated values ΔTest was greater than or equal to the predetermined first amount of deviation ΔT1 (first difference), it corrects the target amount of electric power. In more detail, when the absolute value of the amount of deviation of estimated values ΔTest (difference) was greater than or equal to the predetermined second amount of deviation ΔT2 (second difference) larger than the first amount of deviation ΔT1 (first difference), it corrects the target amount of electric power tWh to zero.

Due to this, when the deviation between the two types of estimated bed temperature estimated by different methods is large and the first estimated bed temperature Test1 calculated based on the engine operating state is low in reliability, the target amount of electric power tWh is corrected to zero and supply of current to the conductive base 151 is prohibited, so overheating of the conductive base 151 can be reliably prevented.

Further, the correcting part is configured so that in the case where the first estimated bed temperature Test1 is lower than the second estimated bed temperature Test2, when the absolute value of the amount of deviation of estimated values ΔTest was less than a predetermined second amount of deviation ΔT2 larger than the first amount of deviation ΔT1, it corrects the target amount of electric power tWh to decrease it. Specifically, in the present embodiment, it is configured so as to correct the target amount of electric power tWh to the minimum amount of electric power Wmin set in advance.

Referring to FIG. 8, as explained above, when the first estimated bed temperature Test1 is lower than the second estimated bed temperature Test2, if supplying the target amount of electric power tWh to the conductive base 151 without correction for warming up the catalyst device 15, the actual bed temperature Tact after the end of warmup is liable to become higher than the activation temperature T2 by exactly the amount of deviation of estimated values ΔTest. At this time, if the absolute value of the amount of deviation of estimated values ΔTest is less than the second amount of deviation ΔT2, even if supplying the target amount of electric power tWh to the conductive base 151 without correction, there is little possibility of the actual bed temperature Tact after the end of warmup ending up becoming higher than the base guaranteed heat resistance temperature T3.

Therefore, in the case where the first estimated bed temperature Test1 is lower than the second estimated bed temperature Test2, when the absolute value of the amount of deviation of estimated values ΔTest is less than the predetermined second amount of deviation ΔT2 larger than the first amount of deviation ΔT1, it is possible to correct the target amount of electric power tWh to decrease it to thereby reliably prevent overheating of the conductive base 151 while keeping the exhaust emission from deteriorating as much as possible after engine startup.

Further, the correcting part is configured so that in the case where the first estimated bed temperature Test1 is higher than the second estimated bed temperature Test2, when the absolute value of the amount of deviation of estimated values ΔTest is less than a predetermined second amount of deviation ΔT2 larger than the first amount of deviation ΔT1, it makes the amount of correction of the target amount of electric power tWh zero and does not correct the target amount of electric power.

When the first estimated bed temperature Test1 is higher than the second estimated bed temperature Test2 and the absolute value of the amount of deviation of estimated values ΔTest is less than the second amount of deviation ΔT2, even if supplying the target amount of electric power tWh to the conductive base 151 for warming up the catalyst device 15, there is an extremely low possibility of the actual bed temperature Tact after the end of warmup ending up becoming higher than the base guaranteed heat resistance temperature T3. Therefore, it is possible to supply the target amount of electric power tWh to the conductive base 151 without correction so as to prevent overheating of the conductive base 151 while keeping the exhaust emission from deteriorating as much as possible after engine startup.

Second Embodiment

Next, a second embodiment of the present disclosure will be explained. The present embodiment differs in content of the target electric power correction processing from the first embodiment. Below, this point of difference will be focused on in the explanation.

As explained above, even in the case where the first estimated bed temperature Test1 is lower than the second estimated bed temperature Test2, if the absolute value of the amount of deviation of estimated values ΔTest is less than the second amount of deviation ΔT2, even if supplying the target amount of electric power tWh calculated at step S4 to the conductive base 151 to warm up the catalyst device 15, there is little possibility of the actual bed temperature Tact after the end of warmup ending up becoming higher than the base heat resistance guaranteeing temperature T3.

Therefore, in the first embodiment, in the case where the first estimated bed temperature Test1 is lower than the second estimated bed temperature Test2, if the absolute value of the amount of deviation of the estimated value ΔTest is less than the second amount of deviation ΔT2, the target amount of electric power tWh was corrected across the board to an amount of electric power smaller than the target amount of electric power tWh calculated at step S4, that is, the minimum amount of electric power Wmin, to thereby prevent overheating of the conductive base 151.

As opposed to this, in the present embodiment, in the case where the absolute value of the amount of deviation of estimated values ΔTest is less than the second amount of deviation ΔT2, the amount of electric power supplied to the conductive base 151 is controlled based on the higher estimated temperature between the first estimated bed temperature Test1 and the second estimated bed temperature Test2. Specifically, the amount of electric power required for making the catalyst bed temperature rise from the higher estimated temperature between the first estimated bed temperature Test1 and the second estimated bed temperature Test2 to the activation temperature T2 is supplied to the conductive base 151.

Due to this, when the first estimated bed temperature Test1 has become lower than the second estimated bed temperature Test2, that is, as shown in the above-mentioned FIG. 8, in the case of supplying the target amount of electric power tWh calculated at step S4 to the conductive base 151, when there is a high possibility of the actual bed temperature Tact after the end of warmup becoming higher than the activation temperature T2, the target amount of electric power tWh is corrected to the amount of electric power Wres required for making the temperature rise from the second estimated temperature Test2 to the activation temperature T2. That is, the target amount of electric power tWh is corrected to an amount of electric power smaller than the target amount of electric power tWh calculated at step S4. By doing this, it is possible to prevent overheating of the conductive base 151 while keeping the exhaust emission right after engine startup from deteriorating as much as possible.

Figure 10:
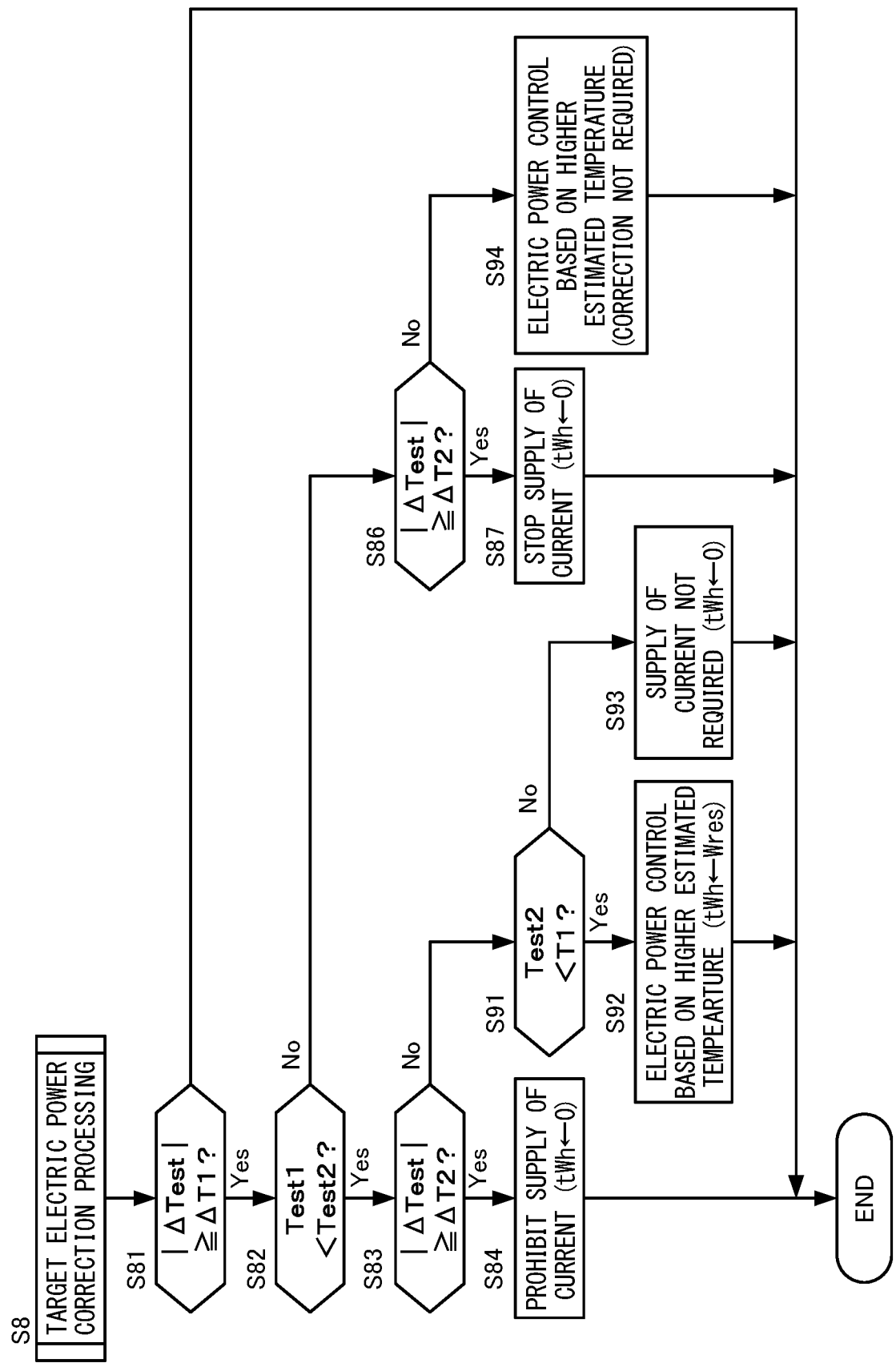
FIG. 10 is a flow chart explaining details of target electric power correction processing according to a second embodiment of the present disclosure.

FIG. 10 is a flow chart explaining details of the target electric power correction processing according to the present embodiment. Note that, in FIG. 10, the contents of the processing of the steps other than steps S91 to S94 are the same as the contents explained in the first embodiment, so here the explanations will be omitted. At step S91, the electronic control unit 200 judges whether the second estimated bed temperature Test2 is less than the activation start temperature T1. If the second estimated bed temperature Test2 is less than the activation start temperature T1, the electronic control unit 200 proceeds to the processing of step S92. On the other hand, if the second estimated bed temperature Test2 is greater than or equal to activation start temperature T1, the electronic control unit 200 proceeds to the processing of step S93. Note that, in the present embodiment, in the present step, it was decided whether to judge whether the second estimated bed temperature Test2 was less than the activation start temperature T1 and proceed to the processing of step S92 or proceed to the processing of step S93, but it is also possible to judge whether the second estimated bed temperature Test2 is less than the activation temperature T2 and proceed to the processing of step S92 or proceed to the processing of step S93.

At step S92, the electronic control unit 200 controls the amount of electric power supplied to the conductive base 151 based on the higher estimated temperature between the first estimated bed temperature Test1 and the second estimated bed temperature Test2, that is, the second estimated bed temperature Test2. Specifically, the electronic control unit 200 calculates the amount of electric power Wres required for making the catalyst bed temperature rise from the second estimated bed temperature Test2 to the activation temperature T2 based on the following formula (3) and corrects the target amount of electric power tWh to the calculated amount of electric power Wres.

[Mathematical 3]

$$Wres = C \times (T2 - Test2) \quad (3)$$

At step S93, the electronic control unit 200 judges that supply of current is unnecessary and corrects the target amount of electric power tWh to zero. This is because if the second estimated bed temperature Test2 is greater than or equal to the activation start temperature T1, there is a high possibility of the exhaust purification function of the catalyst having started to come into play and there is not necessarily a need to supply current to the conductive base 151 to heat it.

In this way, in the present embodiment, when the absolute value of the amount of deviation of estimated values ΔTest is greater than or equal to the first amount of deviation ΔT1 and less than the second amount of deviation ΔT2, when both the first estimated bed temperature Test1 and the second estimated bed temperature Test2 are the activation start temperature T1, the target amount of electric power tWh is corrected. Due to this, it is possible to keep the conductive base 151 from ending up being heated unnecessarily.

At step S94, the electronic control unit 200 controls the amount of electric power supplied to the conductive base 151 based on the higher estimated temperature among the first estimated bed temperature Test1 and the second estimated bed temperature Test2, that is, the first estimated bed temperature Test1. Therefore, in this case, the target amount of electric power tWh calculated at the step S4, that is, the amount of electric power required for making the catalyst bed temperature rise from the first estimated bed temperature Test1 to the activation temperature T2, is supplied to the conductive base 151 without being corrected.

The electric power control part of the electronic control unit 200 according to the present embodiment explained above, like in the first embodiment, is provided with a correcting part correcting the target amount of electric power tWh when the absolute value of the amount of deviation of estimated values ΔTest, comprised of the difference between the first estimated bed temperature Test1 and the second estimated bed temperature Test2, is greater than or equal to the predetermined first amount of deviation ΔT1 (first difference).

Further, in the present embodiment, the correcting part is configured so that in the case where the first estimated bed temperature Test1 is lower than the second estimated bed temperature Test2, when the absolute value of the amount of deviation of estimated values ΔTest (difference) is less than the predetermined second amount of deviation ΔT2 (second difference) larger than the first amount of deviation ΔT1 (first difference), it corrects the target amount of electric power tWh to the amount of electric power Wres required for making the temperature rise from the second estimated bed temperature Test2 to the predetermined activation temperature T2 (warmup completion temperature).

By doing this as well, in the same way as the first embodiment, in the case where the first estimated bed temperature Test1 is lower than the second estimated bed temperature Test2, when the absolute value of the amount of deviation of estimated values ΔTest was less than a predetermined the second amount of deviation ΔT2 larger than the first amount of deviation ΔT1, it is possible to correct the target amount of electric power tWh to decrease, so it is possible to reliably prevent overheating of the conductive base 151 while keeping the exhaust emission after engine startup from deteriorating as much as possible.

In particular, in the present embodiment, the correcting part is configured so that, in the case where the first estimated bed temperature Test1 is lower than the second estimated bed temperature Test2, when the absolute value of the amount of deviation of estimated values ΔTest (difference) was less than a predetermined second amount of deviation ΔT2 (second difference) larger than the first amount of deviation ΔT1 (first difference), it further judges whether the second estimated temperature Test2 is less than the activation start temperature T1 (predetermined temperature), then corrects the target amount of electric power tWh to the amount of electric power Wres required for making the temperature rise from the second estimated bed temperature Test2 to the predetermined activation temperature T2 (warmup completion temperature).

In correcting the target amount of electric power tWh to the amount of electric power Wres required for making the temperature rise from the second estimated bed temperature Test2 to the activation temperature T2, if the second estimated bed temperature Test2 is already greater than or equal to the activation start temperature T1, there is a high possibility of the exhaust purification function of the catalyst starting to come into play and there is not necessarily a need to supply current to the conductive base 151 to heat it. For this reason, in the case where the first estimated bed temperature Test1 is lower than the second estimated bed temperature Test2, if the second estimated bed temperature Test2 is less than the activation start temperature T1, that is, if both the first estimated bed temperature Test1 and the second estimated bed temperature Test2 are less than the activation start temperature T1, it is possible to keep the conductive base 151 from overheating by supplying current to the conductive base 151 to heat it while possible to keep the conductive base 151 from ending up being unnecessarily supplied with current.

Above, embodiments of the present disclosure were explained, but the above embodiments only show some of the examples of application of the present disclosure and are not intended to limit the technical scope of the present disclosure to the specific constitutions of the above embodiments.

For example, in the above embodiments, the target amount of electric power tWh required for making the temperature of the conductive base 151 rise from the first estimated bed temperature Test1 to the predetermined activation temperature T2 (warmup completion temperature) was calculated and the target amount of electric power tWh was corrected based on the amount of deviation of estimated values ΔTest comprised of the difference between the first estimated bed temperature Test1 and the second estimated bed temperature Test2. However, it is also possible to make the amount of electric power Wres required for making the temperature rise from the second estimated bed temperature Test2 to the predetermined activation temperature T2 (warmup completion temperature) the target amount of electric power tWh and correct the target amount of electric power tWh based on the amount of deviation of estimated values ΔTest comprised of the difference between the first estimated bed temperature Test1 and the second estimated bed temperature Test2.

The invention claimed is:

1. A control device for an internal combustion engine provided with an engine body and an electric heating type of catalyst device provided in an exhaust passage of the engine body and supporting a catalyst on a conductive base generating heat by being supplied with current, the control device comprising a catalyst warmup control part configured to supply power to the conductive base to warm up the conductive base, the catalyst warmup control part comprising:
a first estimating part configured to estimate a temperature of the conductive base based on an engine operating state;
a second estimating part configured to estimate the temperature of the conductive base based on a resistance value of the conductive base detected when supplying current to the conductive base; and
an electric power control part configured to control an amount of electric power supplied to the conductive base when warming up the catalyst device based on a result of comparison of magnitudes of a first estimated temperature of the conductive base estimated by the first estimating part and a second estimated temperature of the conductive base estimated by the second estimating part.

2. The control device for an internal combustion engine according to claim 1, wherein
the electric power control part is configured to prohibit supply of electric power to the conductive base when an absolute value of a difference between the first estimated temperature and the second estimated temperature is greater than or equal to a predetermined value.

3. The control device for an internal combustion engine according to claim 1, wherein
the electric power control part comprises
a target electric power calculating part configured to calculate a target amount of electric power required for making the temperature of the conductive base rise from the first estimated temperature to a predetermined warmup completion temperature and
a correcting part configured to correct the target amount of electric power based on a difference between the first estimated temperature and the second estimated temperature.

4. The control device for an internal combustion engine according to claim 3, wherein
the correcting part is configured to correct the target amount of electric power when an absolute value of the difference is greater than or equal to a predetermined first difference.

5. The control device for an internal combustion engine according to claim 4, wherein
the correcting part is configured to correct the target amount of electric power to zero when the absolute value of the difference is greater than or equal to a predetermined second difference larger than the first difference.

6. The control device for an internal combustion engine according to claim 4, wherein
the correcting part is configured to correct the target amount of electric power to decrease it if the first estimated temperature is lower than the second estimated temperature and when the absolute value of the difference was less than a predetermined second difference larger than the first difference.

7. The control device for an internal combustion engine according to claim 6, wherein
the correcting part is configured to correct the target amount of electric power to decrease it by correcting the target amount of electric power to a minimum amount of electric power set in advance.

8. The control device for an internal combustion engine according to claim 6, wherein
the correcting part is configured to correct the target amount of electric power to decrease it by correcting the target amount of electric power to the amount of electric power required for making the target amount of electric power rise from the second estimated temperature to the predetermined warmup completion temperature.

9. The control device for an internal combustion engine according to claim 4, wherein
in the case where the first estimated temperature is lower than the second estimated temperature, when the absolute value of the difference was less than a predetermined second difference larger than the first difference, the correcting part corrects the target amount of electric power to the amount of electric power required for making temperature rise from the second estimated temperature to the predetermined warmup completion temperature if the second estimated temperature is less than the predetermined activation start temperature and judges that warmup is not required and corrects the target amount of electric power to zero if the second estimated temperature is greater than or equal to a predetermined temperature.

10. The control device for an internal combustion engine according to claim 4, wherein
if the first estimated temperature is higher than the second estimated temperature, the correcting part makes the amount of correction for the target amount of electric power zero when the absolute value of the difference was less than a predetermined second difference larger than the first difference.

11. The control device for an internal combustion engine according to claim 1, wherein
the electric power control part comprises:
a target electric power calculating part configured to calculate a target amount of electric power required for making the temperature of the conductive base rise from the second estimated bed temperature to a predetermined warmup completion temperature; and
a correcting part configured to correct the target amount of electric power based on a difference between the first estimated bed temperature and the second estimated bed temperature.

* * * * *